(12) United States Patent
Jiao et al.

(10) Patent No.: US 9,772,393 B2
(45) Date of Patent: Sep. 26, 2017

(54) METHOD AND APPARATUS FOR MODULATION AND DEMODULATION

(71) Applicant: Nokia Technologies Oy, Espoo (FI)

(72) Inventors: Xianjun Jiao, Beijing (CN); Xin Zhang, Beijing (CN); Canfeng Chen, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/906,328

(22) PCT Filed: Jul. 31, 2013

(86) PCT No.: PCT/CN2013/080473
§ 371 (c)(1),
(2) Date: Jan. 20, 2016

(87) PCT Pub. No.: WO2015/013904
PCT Pub. Date: Feb. 5, 2015

(65) Prior Publication Data
US 2016/0178723 A1   Jun. 23, 2016

(51) Int. Cl.
*G01S 1/04* (2006.01)
*H04L 27/12* (2006.01)

(52) U.S. Cl.
CPC ............ *G01S 1/042* (2013.01); *H04L 27/122* (2013.01)

(58) Field of Classification Search
CPC ..................................................... H04L 27/122
(Continued)

(56) References Cited

U.S. PATENT DOCUMENTS

2007/0277083 A1* 11/2007 Van Acht ............ G06F 11/1008
   714/807
2009/0080501 A1*  3/2009 Kim ........................ G01S 13/82
   375/211

(Continued)

FOREIGN PATENT DOCUMENTS

| CN | 102474279 | 5/2012 |
|---|---|---|
| WO | 2012152988 | 11/2012 |
| WO | 2013034952 | 3/2013 |

OTHER PUBLICATIONS

International Search Report and Written Opinion received for corresponding Patent Cooperation Treaty Application No. PCT/CN2013/080473, dated Apr. 30, 2014, 13 pages.

(Continued)

*Primary Examiner* — Helene Tayong
(74) *Attorney, Agent, or Firm* — Locke Lord LLP

(57) ABSTRACT

One of the embodiments of the present invention relates to a method for modulation. The method comprises: providing a first bit sequence of continuous bits "1" or continuous bits "0" generating a second bit sequence by replacing, in each of a plurality of modulation intervals with a predetermined bit number, at least one bit of the first bit sequence at least one fixed position of the respective modulation interval with one information bit from an information bit sequence; and modulating the second bit sequence so as to generate a positioning packet with a modulated continuous wave signal for transmission. The embodiments further relate to a method for demodulation. Embodiments of the present invention also provide corresponding apparatuses and computer program products.

22 Claims, 8 Drawing Sheets

(58) Field of Classification Search
USPC .................................... 375/272, 259, 271
See application file for complete search history.

(56) References Cited

U.S. PATENT DOCUMENTS

| | | |
|---|---|---|
| 2009/0322587 A1 | 12/2009 | Stayton |
| 2010/0302102 A1 | 12/2010 | Desai et al. |
| 2013/0165044 A1 | 6/2013 | Xie et al. |
| 2013/0188538 A1 | 7/2013 | Kainulainen et al. |

OTHER PUBLICATIONS

Extended European Search Report for European Patent Application No. 13890571.6, Dated Feb. 24, 2017, 11 pages.

\* cited by examiner

METHOD AND APPARATUS FOR MODULATION AND DEMODULATION

RELATED APPLICATION

This application was originally filed as PCT Application No. PCT/CN2013/080473 filed Jul. 31, 2013.

TECHNICAL FIELD

The embodiments of the present invention generally relate to wireless communication, particularly to methods and apparatuses for modulation and demodulation in a positioning system.

DESCRIPTION OF THE RELATED ART

Bluetooth Low Energy (BLE) is a new wireless communication technology published by the Bluetooth SIG as a component of Bluetooth Core Specification Version 4.0. BLE is a lower power, lower complexity, and lower cost wireless communication protocol, designed for applications requiring lower data rates and shorter duty cycles. Inheriting the protocol stack and star topology of classical Bluetooth, BLE redefines the physical layer specification, and involves many new features such as a very-low power idle mode, a simple device discovery, and short data packets, etc.

BLE technology is aimed at devices requiring a low power consumption, for example devices that may operate with one or more button cell batteries such as sensors, key fobs, and/or the like. BLE can also be incorporated into devices such as mobile phones, smart phones, tablet computers, laptop computers, desktop computers etc.

SUMMARY OF THE INVENTION

Various aspects of examples of the invention are set out in the claims.

According to an aspect of the present invention, an embodiment of the present invention provides a method for modulation. The method comprises: providing a first bit sequence of continuous bits "1" or continuous bits "0"; generating a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and modulating the second bit sequence so as to generate a positioning packet with a modulated continuous wave signal for transmission.

In one or more embodiments of the present invention, the predetermined bit number $N_{modulation\_interval}$ may satisfy: $N_{modulation\_interval} = n*L_{cw}/N_{measurement\_points}$, where $L_{cw}$ denotes the length of the first sequence of continuous bits; $N_{measurement\_points}$ denotes the number of measurement points, at each of which positioning measurement is performed at receiving side based on the received modulated continuous wave signal by measuring phase differences among a plurality of different antenna elements; n denotes a predefined positive integer.

In one or more embodiments of the present invention, the step of generating a second bit sequence may comprise arranging the bit positions of the replaced information bits and the measurement points such that only bits which belong to the continuous bits but not the replaced information bits will be used at the respective measurement points to perform the positioning measurement at receiving side.

In one or more embodiments of the present invention, the step of generating a second bit sequence may comprise flipping the at least one bit in a modulation interval depending upon the value of a respective information bit.

In one or more embodiments of the present invention, the step of modulating the second bit sequence may comprise modulating the second bit sequence by a Gaussian Frequency-shift Keying modulator.

In one or more embodiments of the present invention, the step of generating a second bit sequence may comprise arranging the bit position of a replaced information bit in a modulation interval and a respective measurement point such that the replaced information bit is separated, by at least one bit, from a bit that will be used at the respective measurement point to perform the positioning measurement at receiving side.

In one or more embodiments of the present invention, the positioning packet may be a Blue Tooth Low Energy packet.

In one or more embodiments of the present invention, the step of modulating the second bit sequence may comprise modulating the second bit sequence by a modulator selected from the group consisting a Frequency-shift Keying modulator, a Phase-shift Keying modulator, a Pulse-amplitude modulation modulator, a Quadrature Amplitude modulation modulator.

According to another aspect of the present invention, an embodiment of the present invention provides a method for demodulation. The method comprises: receiving a positioning packet with a modulated continuous wave signal via a plurality of different antenna elements; demodulating the modulated continuous wave signal to obtain a first bit sequence including a plurality of modulation intervals with a predetermined bit number $N_{modulation\_interval}$, wherein at least one information bit occupies at least one fixed position in each of the plurality of modulation intervals and continuous bits "1" or continuous bits "0" occupy the other positions in the respective modulation intervals; and performing concurrently, based on the modulated continuous wave signal, positioning measurement by measuring phase differences among the plurality of different antenna elements at each of a number $N_{measurement\_points}$ of measurement points.

In one or more embodiments of the present invention, the predetermined bit number $N_{modulation\_interval}$ may satisfy: $N_{modulation\_interval} = n*L_{cw}/N_{measurement\_points}$, where $L_{cw}$ denotes the length of the first sequence of continuous bits; n denotes a predefined positive integer.

In one or more embodiments of the present invention, the measurement points and the bit positions of the information bits may be arranged such that only bits which belong to the continuous bits but not the information bits will be used at the respective measurement points to perform the positioning measurement.

In one or more embodiments of the present invention, the step of demodulating the modulated continuous wave signal may comprise demodulating the modulated continuous wave signal by a Gaussian Frequency-shift Keying demodulator.

In one or more embodiments of the present invention, the bit position of a information bit in a modulation interval and a respective measurement point may be arranged such that the information bit is separated, by at least one bit, from a bit that will be used at the respective measurement point to perform the positioning measurement.

In one or more embodiments of the present invention, the method for demodulation may further comprise applying phase compensation values $c_0, c_1, c_2, \ldots, c_i, \ldots,$ $c_{Nmeasurement\_point-1}$ to the positioning measurement at the respective measurement points.

In one or more embodiments of the present invention, the method for demodulation may further comprise computing, in response to determining that there are two sequential bit flips in the first bit sequence between the $(i-1)^{th}$ measurement point and the $i^{th}$ measurement point, the phase compensation value $c_i$ according to an equation as $c_i=c_{i-1}+Pi$, where the first bit sequence is composed by the continuous bits "1" and the information bits, $c_i=c_{i-1}-Pi$, when first bit sequence is composed by the continuous bits "0" and the information bits; and computing, in response to determining that there is not any bit flip in the first bit sequence between the $(i-1)^{th}$ measurement point and the $i^{th}$ measurement point, the phase compensation value $c_i$ according to an equation as $c_i=c_{i-1}$.

In one or more embodiments of the present invention, the positioning packet may be a Blue Tooth Low Energy packet.

In one or more embodiments of the present invention, the step of demodulating the modulated continuous wave signal may comprise demodulating the modulated continuous wave signal by a demodulator selected from the group consisting a Frequency-shift Keying demodulator, a Phase-shift Keying demodulator, a Pulse-amplitude modulation demodulator, a Quadrature Amplitude modulation demodulator.

According to another aspect of the present invention, an embodiment of the present invention provides a transmitter comprising: a first bit sequence providing unit configured to provide a first bit sequence of continuous bits "1" or continuous bits "0" to a second bit sequence generating unit; the second bit sequence generating unit configured to generate a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and a modulator configured to modulate the second bit sequence generated by the second bit sequence generating unit so as to generate a positioning packet with a modulated continuous wave signal for transmission.

In one or more embodiments of the present invention, the predetermined bit number $N_{modulation\_interval}$ may satisfy: $N_{modulation\_interval}=n*L_{cw}/N_{measurement\_points}$, where $L_{cw}$ denotes the length of the first sequence of continuous bits; $N_{measurement\_points}$ denotes the number of measurement points, at each of which positioning measurement is performed at receiving side based on the received modulated continuous wave signal by measuring phase differences among the plurality of different antenna elements; n denotes a predefined positive integer.

In one or more embodiments of the present invention, the second bit sequence generating unit may be configured to arrange the bit positions of the replaced information bits and the measurement points such that only bits which belong to the continuous bits but not the replaced information bits will be used at the respective measurement points to perform the positioning measurement at receiving side.

In one or more embodiments of the present invention, the second bit sequence generating unit may be further configured to flipping the at least one bit in a modulation interval depending upon the value of a respective information bit.

In one or more embodiments of the present invention, the modulator may be a Gaussian Frequency-shift Keying modulator.

In one or more embodiments of the present invention, the second bit sequence generating unit may be configured to arrange the bit position of a replaced information bit in a modulation interval and a respective measurement point such that the replaced information bit is separated, by at least one bit, from a bit that will be used at the respective measurement point to perform the positioning measurement at receiving side.

In one or more embodiments of the present invention, the positioning packet may be a Blue Tooth Low Energy packet.

In one or more embodiments of the present invention, the modulator may be a modulator selected from the group consisting a Frequency-shift Keying modulator, a Phase-shift Keying modulator, a Pulse-amplitude modulation modulator, a Quadrature Amplitude modulation modulator.

According to another aspect of the present invention, an embodiment of the present invention provides a receiver comprising: a receiving unit comprising a plurality of different antenna elements, configured to receive a positioning packet with a modulated continuous wave signal; a demodulating unit configured to demodulate the modulated continuous wave signal to obtain a first bit sequence including a plurality of modulation intervals with a predetermined bit number $N_{modulation\_interval}$, wherein at least one information bit occupies at least one fixed position in each of the plurality of modulation intervals and continuous bits "1" or continuous bits "0" occupy the other positions in the respective modulation intervals; and a positioning measurement unit configured to perform concurrently, based on the modulated continuous wave signal, positioning measurement by measuring phase differences among the plurality of different antenna elements at each of a number $N_{measurement\_points}$ of measurement points.

In one or more embodiments of the present invention, the predetermined bit number $N_{modulation\_interval}$ may satisfy: $N_{modulation\_interval}=n*L_{cw}/N_{measurement\_points}$, where $L_{cw}$ denotes the length of the first sequence of continuous bits; n denotes a predefined positive integer.

In one or more embodiments of the present invention, the measurement points and the bit positions of the information bits may be arranged such that only bits which belong to the continuous bits but not the information bits will be used at the respective measurement points to perform the positioning measurement.

In one or more embodiments of the present invention, the demodulating unit comprises a Gaussian Frequency-shift Keying demodulator.

In one or more embodiments of the present invention, the bit position of a information bit in a modulation interval and a respective measurement point may be arranged such that the information bit is separated, by at least one bit, from a bit that will be used at the respective measurement point to perform the positioning measurement.

In one or more embodiments of the present invention, the positioning measurement unit further may comprise: phase compensation unit configured to apply phase compensation values $c_0, c_1, c_2, \ldots, c_i, \ldots, c_{Nmeasurement\_point-1}$ to the positioning measurement at the respective measurement points.

In one or more embodiments of the present invention, the phase compensation unit may be further configured to compute, in response to determining that there are two sequential bit flips in the first bit sequence between the $(i-1)^{th}$ measurement point and the $i^{th}$ measurement point, the phase compensation value $c_i$ according to an equation as $c_i=c_{i-1}+Pi$, where the first bit sequence is composed by the continuous bits "1" and the information bits, as $c_i=c_{i-1}-Pi$, when first bit sequence is composed by the continuous bits "0" and the information bits; and compute, in response to determining that there is not any bit flip in the first bit sequence between the $(i-1)^{th}$ measurement point and the $i^{th}$ measurement point, the phase compensation value $c_i$ according to an equation as $c_i=c_{i-1}$.

In one or more embodiments of the present invention, the positioning packet may a Blue Tooth Low Energy packet.

In one or more embodiments of the present invention, the demodulating unit may comprise a demodulator selected from the group consisting a Frequency-shift Keying demodulator, a Phase-shift Keying demodulator, a Pulse-amplitude modulation demodulator, a Quadrature Amplitude modulation demodulator.

In one or more embodiments of the present invention, the demodulating unit may be configured to be coupled to one of the plurality of different antenna elements.

According to another aspect of the present invention, an embodiment of the present invention provides an apparatus for modulation. The apparatus comprises: at least one processor; and at least one memory including compute program instructions, wherein the at least one memory and computer program instructions are configured to, with the at least one processor, cause the apparatus at least to: provide a first bit sequence of continuous bits "1" or continuous bits "0"; generate a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and modulate the second bit sequence so as to generate a positioning packet with a modulated continuous wave signal for transmission.

According to another aspect of the present invention, an embodiment of the present invention provides an apparatus for demodulation. The apparatus comprises: at least one processor; and at least one memory including compute program instructions, wherein the at least one memory and computer program instructions are configured to, with the at least one processor, cause the apparatus at least to: receive a positioning packet with a modulated continuous wave signal via a plurality of different antenna elements; demodulate the modulated continuous wave signal to obtain a first bit sequence including a plurality of modulation intervals with a predetermined bit number $N_{modulation\_interval}$, wherein at least one information bit occupies at least one fixed position in each of the plurality of modulation intervals and continuous bits "1" or continuous bits "0" occupy the other positions in the respective modulation intervals; and perform concurrently, based on the modulated continuous wave signal, positioning measurement by measuring phase differences among the plurality of different antenna elements at each of a number $N_{measurement\_points}$ of measurement points.

According to another aspect of the present invention, an embodiment of the present invention provides a computer program comprising machine-readable instructions that when executed by apparatus comprising a transmitter cause it to perform the method for modulation according to one or more embodiments of the present invention.

According to another aspect of the present invention, an embodiment of the present invention provides a computer program comprising machine-readable instructions that when executed by apparatus comprising a transmitter cause it to perform the method for demodulation according to one or more embodiments of the present invention.

According to another aspect of the present invention, an embodiment of the present invention provides a computer program product, comprising at least one computer readable storage medium having a computer readable program code portion stored thereon, the computer readable program code portion comprising: program code instructions for providing a first bit sequence of continuous bits "1" or continuous bits "0"; program code instructions for generating a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and program code instructions for modulating the second bit sequence so as to generate a positioning packet with a modulated continuous wave signal for transmission.

According to another aspect of the present invention, an embodiment of the present invention provides a computer program product, comprising at least one computer readable storage medium having a computer readable program code portion stored thereon, the computer readable program code portion comprising: program code instructions for receiving a positioning packet with a modulated continuous wave signal via a plurality of different antenna elements; program code instructions for demodulating the modulated continuous wave signal to obtain a first bit sequence including a plurality of modulation intervals with a predetermined bit number $N_{modulation\_interval}$, wherein at least one information bit occupies at least one fixed position in each of the plurality of modulation intervals and continuous bits "1" or continuous bits "0" occupy the other positions in the respective modulation intervals; and program code instructions for performing concurrently, based on the modulated continuous wave signal, positioning measurement by measuring phase differences among the plurality of different antenna elements at each of a number $N_{measurement\_points}$ of measurement points.

According to another aspect of the present invention, an embodiment of the present invention provides an apparatus for modulation. The apparatus comprises: means for providing a first bit sequence of continuous bits "1" or continuous bits "0"; means for generating a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and means for modulating the second bit sequence so as to generate a positioning packet with a modulated continuous wave signal for transmission.

According to another aspect of the present invention, an embodiment of the present invention provides an apparatus for demodulation. The apparatus comprises: means for receiving a positioning packet with a modulated continuous wave signal via a plurality of different antenna elements; means for demodulating the modulated continuous wave signal to obtain a first bit sequence including a plurality of modulation intervals with a predetermined bit number $N_{modulation\_interval}$, wherein at least one information bit occupies at least one fixed position in each of the plurality of modulation intervals and continuous bits "1" or continuous bits "0" occupy the other positions in the respective modulation intervals; and means for performing concurrently, based on the modulated continuous wave signal, positioning measurement by measuring phase differences among the plurality of different antenna elements at each of a number $N_{measurement\_points}$ of measurement points.

BRIEF DESCRIPTION OF THE DRAWINGS

Inventive features regarded as the characteristics of the present invention are set forth in the appended claims.

However, the present invention, its implementation mode, other objectives, features and advantages will be better understood through reading the following detailed description on the exemplary embodiments with reference to the accompanying drawings, where in the drawings.

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. For example, some embodiments of the present invention are not limited to be implemented in BLE system. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

BLE technology has been proposed to be used in high accuracy indoor positioning (HAIP) systems. HAIP with BLE uses an array of phased antennas to calculate angle-of-departure or angle-of-arrival of a signal. The principles behind calculating the angle-of-departure or angle-of-arrival are described in the prior art.

There are two main options for positioning a mobile device or beacon in a BLE HAIP system. The same applies to other MIMO antenna systems, and to other beamforming systems.

In a first option, the mobiles/tags transmit a BLE positioning packet, which is received at a base station/beacon (which can be called a locator) including an antenna array. The base station/beacon (or some other device) measures the angle-of-arrival (both azimuth and elevation angles) of the signal using samples of the positioning packet received at different elements of the antenna array, and consequently calculates the position of the mobile/tag. This can be called network-centric positioning. The network-centric approach is limited by capacity.

In a second option, a base station includes an antenna array and transmits a BLE positioning packet from different elements of the antenna array in a way that allows the mobile/tag to calculate the angle-of-departure (both azimuth and elevation angles) of the signal from the base station. The base station here can be termed a beacon. This can be termed mobile-centric positioning. The mobile-centric case is advantageous from the capacity point of view as any number of devices can measure and use broadcast signals for positioning purposes.

A base station or beacon may be able to operate according to both options.

It is the network-centric option that is of primary interest in the following, although of course a beacon may operate in the network-centric mode as well as the mobile-centric mode.

Figure 1:
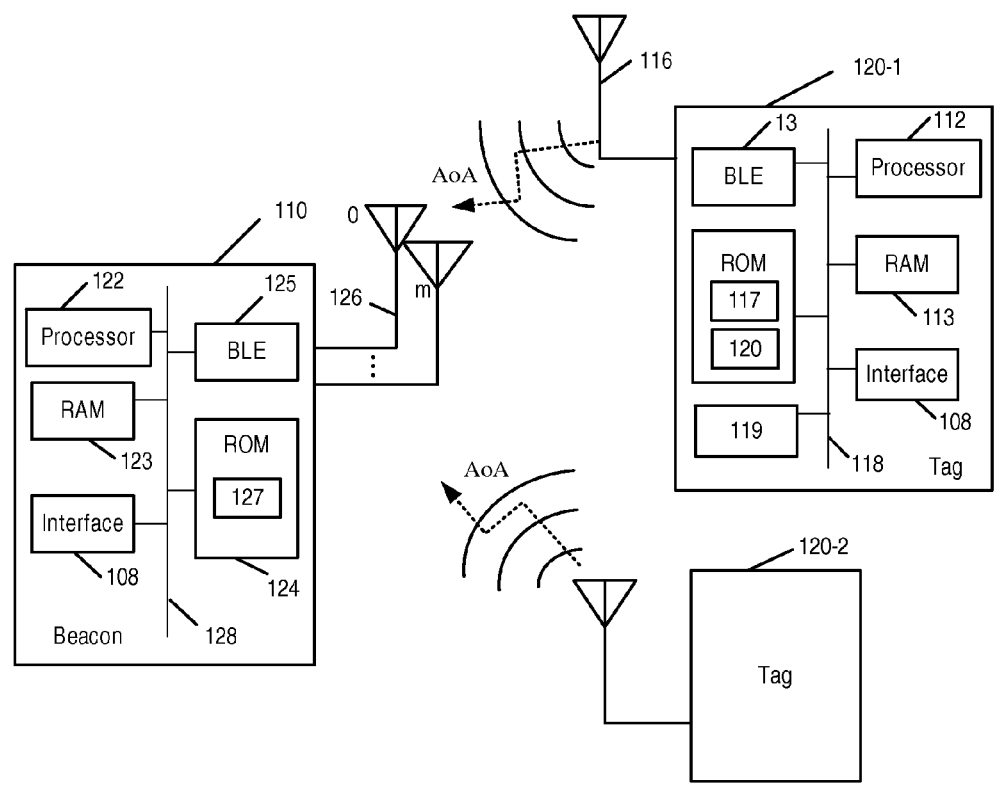
FIG. 1 schematically illustrates system 10 in which one or more embodiments of the present invention may be implemented.

FIG. 1 shows a system in which one or more embodiment according to the present invention can be implemented.

As shown in FIG. 1, the system 100 includes a beacon such as for example a BLE beacon 110. The system 100 also includes a first device 120-1 and a second device 120-2, each of which may be referred to as a tag. The first and second tags 120-1, 120-2 can be stand-alone or inside devices or other asset and their locations can be tracked by the beacon 110. Each of the first and second tags 120-1, 120-2 is able to transmit positioning packet to the BLE beacons 110. The positioning packets may be transmitted periodically from each of the tags 120-1, 120-2 to the beacon 110.

Briefly, the beacon 110 is located for example within a building and periodically receives BLE positioning packets transmitted from the tags 120-1, 120-2 to determine the directions of the tags 120-1, 120-2. The beacon 30 has multiple antenna elements which are used sequentially during the receipt of the BLE positioning packet with the continuous wave signal. The sequence of antenna elements involves switching between them in a pre-defined order. The beacon 110 measures phase differences among different antenna elements of coming continuous wave signal from each of the tags 120-1, 120-2. According to the measured phase differences, AoA (Angle of Arrival) is estimated, and then direction of the respective tag can be found.

The transmission efficiency of positioning packets may be very important in specific application area, especially those scenarios where the tags 120-1 and 120-2 need to operate in ultra-low power.

In those scenarios which need ultra-low power tags, the tag may be configured to only transmit signals and not to receive any signal. The transmitted information may be very little (for example, dozens of bits). For instance, information that has to be transmitted may only relate to the tag's ID or slow rate reports such as environment or body temperature, humidity, blood pressure, heart beat rate, number of breath per minute, etc. In these situations, power consumption of the tag is mainly decided by the duration of power-on-for-transmitting time. However, in the prior art, the continuous wave signal is unable to bear any information bits, because it is specific to positioning measurement. Therefore, the tag has to transmit extra information bits in the extra period/time other than continuous wave period. The inventors of the present invention has noted that it would be advantageous if these information bits can be embedded totally or partially into the continuous wave signal as it would shorten the power-on-for-transmitting time significantly.

The tag 120-1 includes a BLE module 13, which operates according to the BLE standard. The beacon 110 also includes a BLE module 125 that operates according to the BLE standard.

The tag 120-1 includes a processor 112. The processor 112 is connected to volatile memory such as RAM 113 by a bus 118. The bus 118 also connects the processor 112 and the RAM 113 to non-volatile memory, such as ROM 114. The BLE module 13 is coupled to the bus 118, and thus also to the processor 112 and the memories 113, 114. An antenna 116 is coupled to the BLE module 13. Within the ROM 114 is stored a software application 117. The software application 117 in these embodiments is a navigation application, although it may take some other form. The ROM 114 of the tag 120-1 also stores information 120. The information 120 may include an identifier that identifies the tag 120-1.

The tag 120-1 may take any suitable form. Generally speaking, the tag 120-1 may comprise processing circuitry 112, including one or more processors, and a storage device 114, 113, comprising a single memory unit or a plurality of memory units. The storage device 114, 113 may store computer program instructions that, when loaded into the processing circuitry 112, control the operation of the tag 120-1.

The BLE module 13 may take any suitable form. Generally speaking, the BLE module 13 of the tag 120-1 may comprise processing circuitry, including one or more processors, and a storage device comprising a single memory unit or a plurality of memory units. The storage device may store computer program instructions that, when loaded into the processing circuitry, control the operation of the BLE module 13.

The tag 120-1 also comprises a number of components which are indicated together at 119. These components 119 may include any suitable combination of a display, a user input interface, other communication interfaces (e.g. WiFi, etc.), a speaker, a microphone, and a camera. The components 119 may be arranged in any suitable way.

The tag 120-2 may be configured and operate in the same way as the tag 120-1.

The beacon 110 includes a BLE module 125, antenna array 126, a processor 122, RAM 123, ROM 124, software 127 and a bus 128. All these components are constituted and connected in any suitable way. The software 127 may be configured to control the BLE module 125 to operate in a positioning mode in which it calculates the position of the tags 120-1, 120-2.

The beacon 110 includes a communication interface 108, using which information communications can be received from the tags according to one or more embodiments of the present invention.

The BLE module 125 of the beacon 30 may solely be a receiver and may not perform transmitter functions. The BLE module 125 may include hardware needed for transmitting, the transmit function being disabled through the software 127. Alternatively, the BLE module 125 may be absent of some of the hardware needed for transmitting. Put another way, it may be a transmitter or it may be a transceiver in which the transmit functions have been disabled in software. The BLE module 125 may alternatively include transmit functionality.

Each of the BLE beacons 30 includes multiple antenna elements (indicated together at antenna array 126) and receives AoA positioning messages using these multiple antenna elements in a switched sequence. By receiving the AoA positioning messages from the tags 120-1, 120-2 in this way, the beacon 110 can calculate from parameters of the received signal that included the AoA positioning message an angle (actually, both azimuth and elevation angles) at which the tags 120-1, 120-2 is located.

The beacon 110 may take any suitable form. Generally speaking, the beacon 110 may comprise processing circuitry, including one or more processors, and a storage device, comprising a single memory unit or a plurality of memory units. The storage device may store computer program instructions that, when loaded into the processing circuitry, control the operation of the beacon 110.

Some further details of components and features and alternatives for them will now be described.

Figure 8:
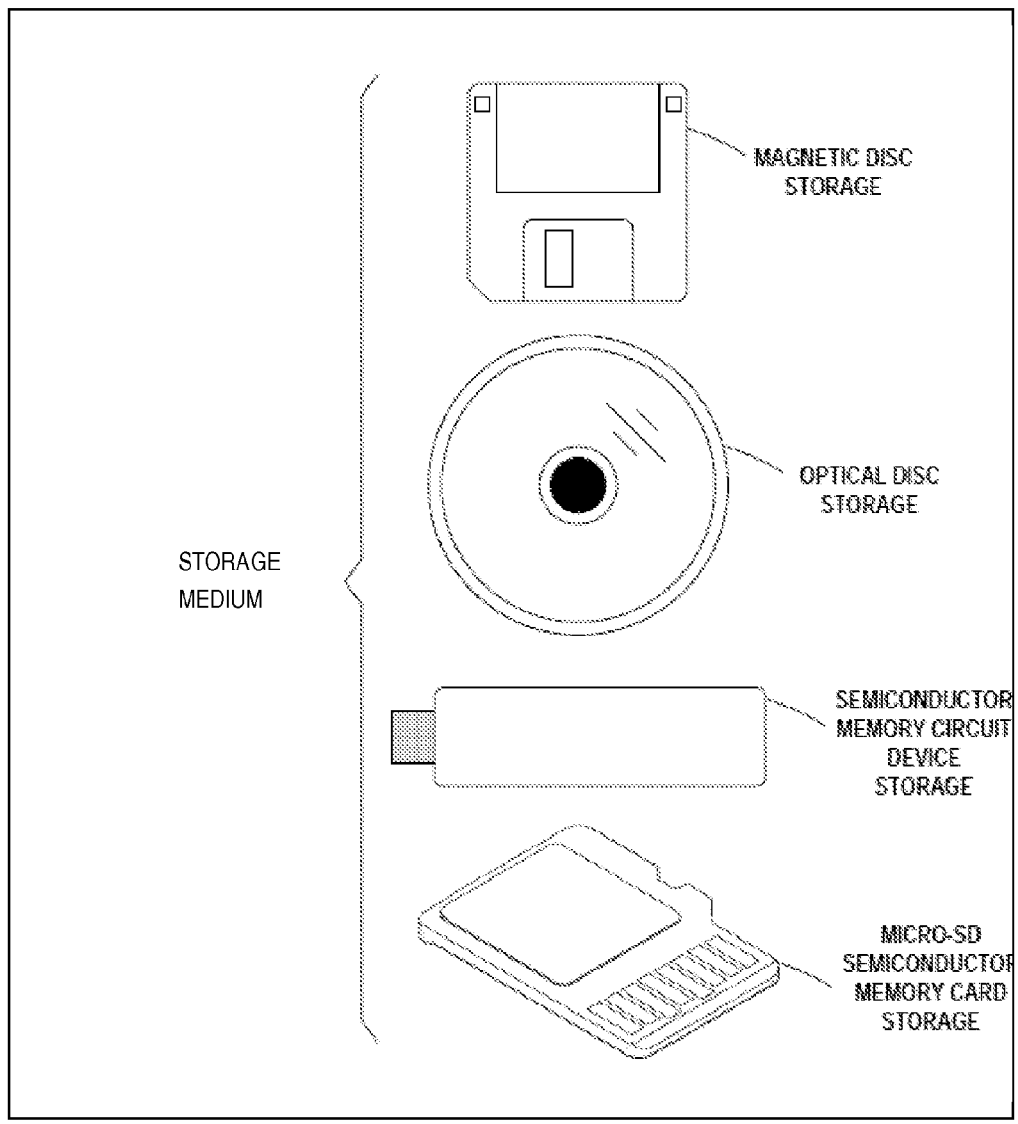
FIG. 8 schematically illustrates exemplary storage medium, in which one or more embodiments of the present invention may be embodied.

The computer program instructions 117 may provide the logic and routines that enables the tag 120-1 to perform the functionality described below. The computer program instructions 117 may be pre-programmed into the tag 120-1. Alternatively, they may arrive at the tag 120-1 via an electromagnetic carrier signal or be copied from a physical entity such as a computer program product, a non-volatile electronic memory device (e.g. flash memory) or a storage medium as shown in FIG. 8, such as a magnetic disc storage, optical disc storage, semiconductor memory circuit device storage, micro-SD semiconductor memory card storage. They may for instance be downloaded to the tag 120-1 from a server such as a server of an application marketplace or store.

The processing circuitry 112, 122 may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry or processor 112, 122 may be termed processing means.

Typically, the BLE modules 13, 125 each comprise a processor coupled connected to both volatile memory and non-volatile memory. The computer program is stored in the non-volatile memory and is executed by the processor using the volatile memory for temporary storage of data or data and instructions.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Each BLE module 13, 125 may be a single integrated circuits. Each may alternatively be provided as a set of integrated circuits (i.e. a chipset). The BLE modules 13, 125 may alternatively be hardwired, application-specific integrated circuits (ASIC).

Figure 2:
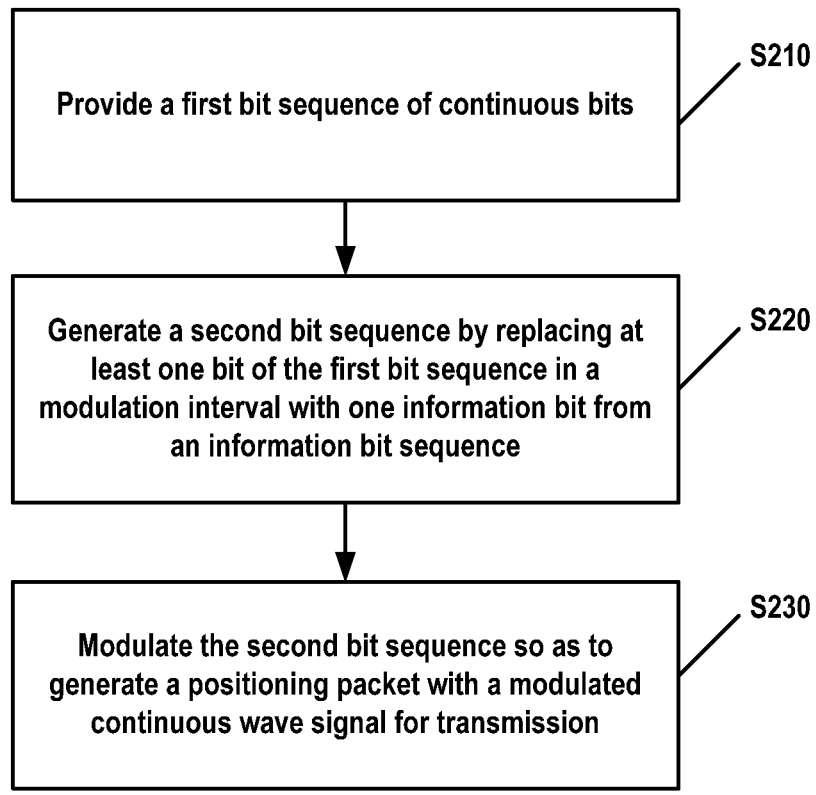
FIG. 2 schematically illustrates an exemplary flow chart of a method for modulation at a transmitter according to one or more embodiments of the present invention.
Figure 3:
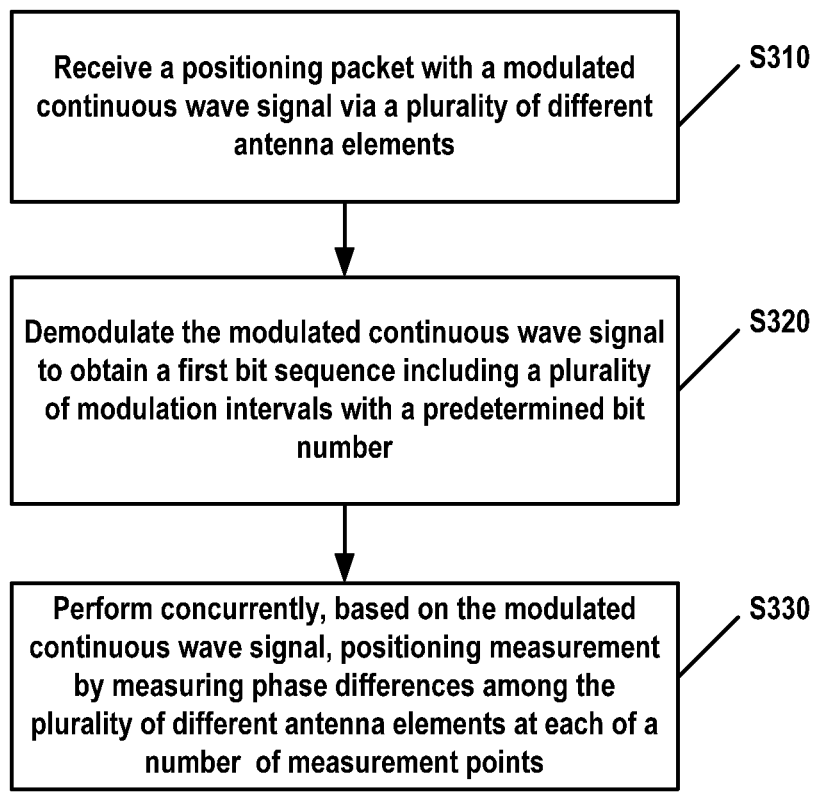
FIG. 3 schematically illustrate an exemplary flow chart of a method for demodulation at a receiver according to one or more embodiments of the present invention.

With references to FIGS. 2 to 3, various embodiments of the present invention will be set forth in detail.

FIG. 2 schematically illustrates an exemplary flow chart of a method 200 for modulation at a transmitter for example a tag according to one or more embodiments of the present invention.

As shown in FIG. 2, in step S210, a first bit sequence of continuous bits is provided. The continuous bits may be continuous bits "1" or continuous bits "0". In the original continuous wave transmitting scheme of a tag, according to BLE specification (symbol rate of 1 mega-symbols per second), there may be 136 continuous bits "1" or continuous bits "0" at 1 MHz rate.

In step S220, a second bit sequence is generated by replacing some bits in the first bit sequence of continuous bits with information bits from an information bit sequence. The second bit sequence comprises a plurality of modulation intervals with a predetermined bit number $N_{modulation\_interval}$. The generated second bit sequence intends to carry additional information bits from the information bit sequence and will be modulated in a modulator for further transmission.

In an implementation, in each modulation interval, one bit of the first bit sequence at a fixed position of the modulation interval may be replaced with one information bit from the information bit sequence. In other implementation, in each modulation interval, more than one bit of the first bit sequence in fixed positions of the modulation interval may be replaced with the same one information bit from the information bit sequence. The number of replaced information bit in a modulation interval depends on the length of the modulation interval.

According to one or more embodiments of the present invention, in generating the second bit sequence, the bit positions of the replaced information bits and the measurement points may be arranged such that only bits which belong to the continuous bits but not the replaced information bits will be used at the respective measurement points to perform the positioning measurement at receiving side. The bit positions of the replaced information bit may be predetermined based on the switching frequency of the antenna elements, the frequency of the continuous wave signal and the bit position information of the measurement points, where at each of measurement points positioning measurement is performed at receiving side (i.e., at a beacon).

According to one or more embodiments of the present invention, the predetermined bit number $N_{modulation\_interval}$ of a modulation interval may satisfy:

$$N_{modulation\_interval}=n*L_{cw}/N_{measurement\_points} \quad 1)$$

where $L_{cw}$ denotes the length of the first sequence of continuous bits; $N_{measurement\_points}$ denotes the number of measurement points, at each of which positioning measurement is performed at receiving side (i.e., at a beacon) based on the received modulated continuous wave signal; n denotes a predefined positive integer. At receiving side, the beacon is configured to measure phase differences between different antenna elements at the measurement points.

Take 15 antenna elements of a beacon as an example, the total number of measurement points may be 34 for a complete switching pattern. If the switching frequency for the multiple antenna elements at the beacon is 250 kHz, the total length of original continuous wave signal is 34*4 us=136 us. According to BLE specification, the continuous wave signal has a symbol rate of 1 mega-symbols per second. When n is predetermined as one, then $N_{modulation\_interval}$ can be set as 4. In this regard, per 4 bits of the first bit sequence, there is one bit replaced by one information bit. When n is predetermined as a value more than one, then $N_{modulation\_interval}$ may be set as n times of 4. In this regard, per 4*n bits of the first bit sequence, there may be at most n bits replaced by the same one bit of the information bit sequence.

According to one or more embodiments of the present invention, replacing a bit of the first bit sequence may be performed by flipping from "1" to "0" or "0" to "1" depending upon the value of a respective information bit. In an exemplary implementation where the first bit sequence is continuous bits "1", the bit may be kept unchanged ("1") under the condition of the information bit "0"; and the bit may be flipped from "1" to "0" under the condition of the information bit "1", and vice versa. In another exemplary implementation where the first bit sequence is the continuous bits "0", the bit may be kept unchanged ("0") under the condition of the information bit "0"; and the bit may be flipped from "0" to "1" under the condition of the information bit "1", and vice versa.

In step S230, the second bit sequence is modulated so as to generate a positioning packet with a modulated continuous wave signal for transmission.

According to BLE specification, GFSK (Gaussian Frequency-shift Keying) is used to modulate BLE packets. Therefore, in one or more preferred embodiments of the present invention, the second bit sequence may be modulated by a GFSK modulator. Due to the frequency deviation property of GFSK, in one or more preferred embodiment, when generating the second bit sequence in step S220, the bit position of a replaced information bit in a modulation interval and a respective measurement point should be arranged such that the replaced information bit is separated, by at least one bit, from a bit that will be used at the respective measurement point to perform the positioning measurement at receiving side. The extra bit spacing between the information bit and the bit corresponding to an adjacent measurement point may ensure that the additional information bits carried in the second bit sequence will introduce no negative impact to phase measurement in the receiving beacon. This will be described in more details with reference the relevant steps of FIG. 3.

As alternative embodiments, the second bit sequence may also be modulated by FSK (Frequency-shift Keying) modulator; PSK (Phase-shift Keying) modulator such as BPSK modulator, QPSK modulator, 8PSK modulator, etc.; PAM (Pulse-amplitude modulation) modulator; QAM (Quadrature Amplitude modulation) modulator such as 16QAM modulator, 64QAM modulator, etc.

FIG. 3 schematically illustrates an exemplary flow chart of a method 300 for demodulation at a receiver for example a beacon according to one or more embodiments of the present invention.

As shown in FIG. 3, in step S310, a positioning packet with the modulated continuous wave signal transmitted from the transmitter is received via a plurality of different antenna elements of the beacon. The modulated continuous wave signal for example may have 1 MHz symbol rate.

In step S320, the modulated continuous wave signal is demodulated to obtain a first bit sequence including a plurality of modulation intervals with a predetermined bit number $N_{modulation\_interval}$. In each of the modulation intervals, at least one information bit occupies at least one fixed bit position and continuous bits "1" or continuous bits "0" occupy the other bit positions.

In one or more embodiments of the present invention, the predetermined bit number $N_{modulation\_interval}$ satisfies:

$$N_{modulation\_interval}=n*L_{cw}/N_{measurement\_points},$$

where $L_{cw}$ denotes the length of the first bit sequence of continuous bits; n denotes a predefined positive integer.

In one or more embodiments of the present invention, the modulated continuous wave signal may be demodulated by a GFSK demodulator. In other alternative embodiments, the modulated continuous wave signal may be demodulated by FSK demodulator; PSK demodulator such as BPSK demodulator, QPSK demodulator, 8PSK demodulator, etc.; PAM demodulator; QAM demodulator such as 16QAM demodulator, 64QAM demodulator, etc.

In step S330, positioning measurement is performed concurrently based on the modulated continuous wave signal by measuring phase differences among the plurality of different antenna elements at each of a number $N_{measurement\_points}$ of measurement points.

Those skilled in the art may appreciate that measuring phrase differences based on a conventional continuous wave signal (un-modulated by the information bit sequence) requires that instant phase is always kept the same value at each measurement point, i.e., measurement period being set as integer times of the period of the continuous wave signal (for example, sine wave). The measurement period is actually the switching period of elements (inverse of switching frequency), when there is only one measurement time point for each element in one measurement period.

For example, the continuous wave signal is s(t)=sin (2*pi*f*t+p), where f is continuous wave frequency, p is continuous wave phase; switching period is T second, and T=n*(1/f), where n is positive integer, (1/f) is continuous wave period. Apparently that if elements are switched every T second, the phases measured at each element will constantly be kept the same phase p. In the above scenario, the different propagation delays from the transmitter such as a tag to all antenna elements of the beacon are not considered. In actual world, these different delays cause phase changes to signals measured in each antenna element. That is, measured phases at all antenna elements may be denoted as p+q0, p+q1, p+q2, . . . p+qm, where p is the fixed but unknown phase, q0 to qm are different phases caused by different propagation delays. Without estimating phase p, phase differences between any elements can be drawn by differential operation between measured phases of two different antenna elements. Usually the 1st element is defined as reference element and labeled with element 0, other elements are labeled with element 1, element 2, element 3 . . . element m. The useful phase differences for direction finding are differences between elements 1 to m and element 0, i.e., q1-q0, q2-q0 . . . qm-q0, which can be obtained easily by subtracting element 0 measured phase from element 1 to m measured phases.

According to one or more embodiments of the present invention, the measurement points and the bit positions of the information bits may be arranged such that only bits which belong to the continuous bits but not the information bits will be used at the respective measurement points to perform the positioning measurement. In this way, the requirement for measuring phase differences between antenna elements can be met, even though the continuous wave signal has been modulated to bear extra information bits.

In the embodiments where the modulated continuous wave signal is a GFSK modulated signal, the bit position of a information bit in a modulation interval and a respective measurement point should be arranged such that the replaced information bit is separated, by at least one bit, from a bit that will be used at the respective measurement point to perform the positioning measurement at receiving side.

Figure 4:
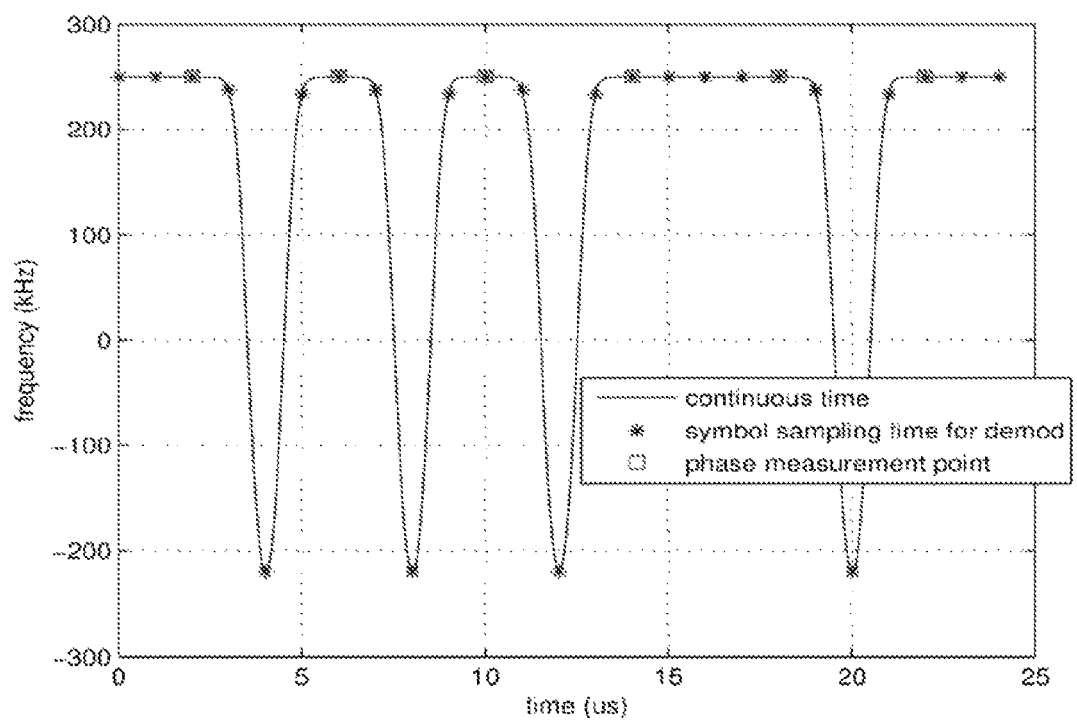
FIG. 4 schematically illustrates a frequency-time simulated curve of a modulated continuous wave signal.
Figure 5:
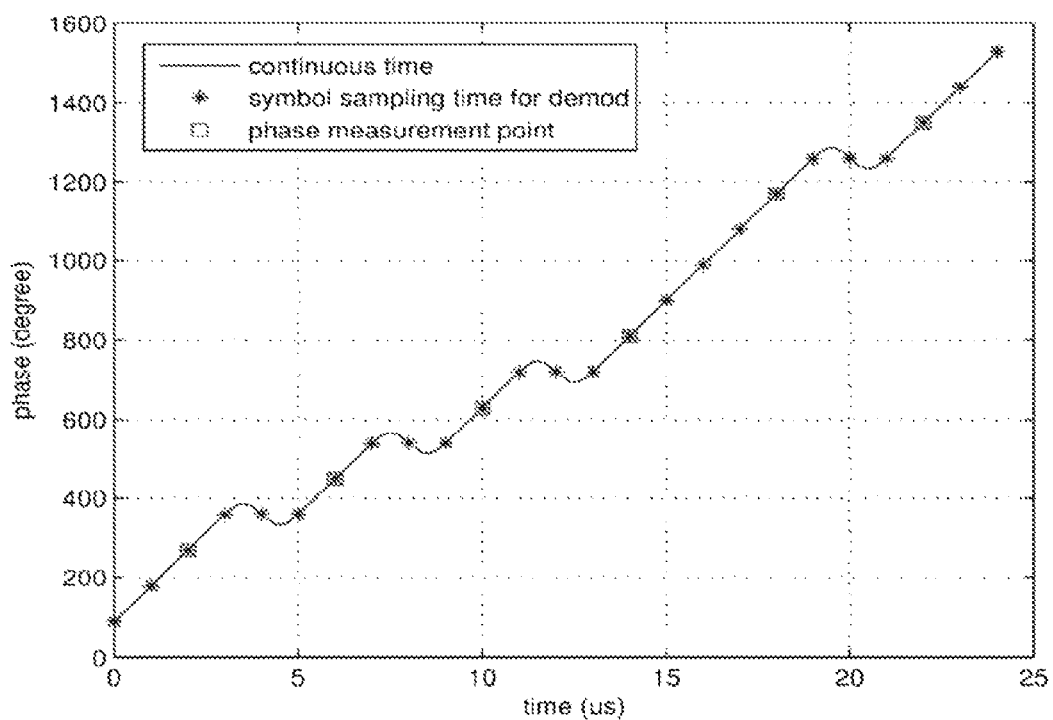
FIG. 5 schematically illustrates a phase-time simulated curve of a modulated continuous wave signal.

FIGS. 4 and 5 schematically show the arrangement of information bits and the measurement points in the GFSK modulated continuous wave signal.

Exemplary parameters of GFSK modulation may be set as below:

Symbol rate 1 Msps;

Frequency Gaussian Pulse length 4 symbols;

Modulation index 0.5;

Bandwidth time product 0.5.

Assumes that the continuous bits are continuous bits "1" and the first six transmitted information bits are "1" "1" "1" "0" "1" and "0", then the first bit sequence demodulated from the GFSK demodulator may be 1 1 1 0, 1 1 1 0, 1 1 1 0, 1 1 1 1, 1 1 1 0, 1 1 1 1. The frequency-time and phase-time curves of GFSK modulated continuous wave signal are simulated and shown in FIG. 4 and FIG. 5, respectively.

As shown in FIGS. 4 and 5, "symbol sampling time for demod" denoted with sign "*" indicates that at this time point, the GFSK demodulator makes decision on received signal, for example, if frequency deviation is positive, "1" is outputted; if frequency deviation is negative, "0" is outputted. "phase measurement point" denoted with sign "□" indicates that at a measurement point, phase of the current antenna element is measured and then the receiver is controlled to switch to the next antenna element at the next measurement point according to switching pattern.

In FIG. 4, it can be found that according to BLE GFSK specification, for example, when one bit "0" is surrounded by bits "1", the bit "0" will not generate maximum negative frequency deviation −fd (−250 kHz), but will generate a frequency deviation which is not less than 80% of fd. For the pre and post bits "1" around this bit "0", maximum positive frequency deviation fd (250 kHz) cannot be generated either, instead, frequency deviation which is not less than 80% of fd will be generated. For those bits "1", which are more far away from the flipped bit "0", for example, being separated by at least one bit from the bit "0", they will have time to become a stable maximum frequency deviation (250 kHz) and stable phase. Those bits "1" that are stable points just like those in a normal continuous wave signal may be chosen to be measured at a measurement point.

In FIG. 5, a phenomenon of phase changing can be found that when there is a transition "1"-"0"-"1" existed in the demodulated first bit sequence, adjacent two measurement points will have 180 degree (pi) phase difference; when there is no transitions, i.e., there are only continuous bits "1", adjacent two measurement points will have the same phases, as shown in FIG. 5, with phase difference of 360 degree (2*pi). In order to compensate the phase deviation of Pi caused by the transition, a series of phase compensation values $c_0, c_1, c_2, \ldots, c_i, \ldots, c_{Nmeasurement\_point-1}$ can be defined for each of the measurement points.

According to one or more embodiments of the present invention, the method 300 may further comprise a step of applying phase compensation values $c_0, c_1, c_2, \ldots, c_i, \ldots, c_{Nmeasurement\_point-1}$ to the positioning measurement at the respective measurement points (not shown in FIG. 3).

In one or more embodiments of the present invention, if it is determined that there are two sequential bit flips (i.e., one bit transition "1"-"0"-"1" or "0"-"1"-"0") in the first bit sequence between the $(i-1)^{th}$ measurement point and the $i^{th}$ measurement point, then the phase compensation value $c_i$ may be computed as below:

$$c_i = c_{i-1} + Pi, \qquad 2)$$

when the first bit sequence is composed by the continuous bits "1" and the information bits and thus the transition is "1"-"0"-"1";

$$c_i = c_{i-1} - Pi, \qquad 3)$$

when first bit sequence is composed by the continuous bits "0" and the information bits and thus the transition is "0"-"1"-"0".

If it is determined that there is not any bit flip (i.e., no bit transition "1"-"0"-"1" or "0"-"1"-"0") in the first bit sequence between the $(i-1)^{th}$ measurement point and the $i^{th}$ measurement point, the phase compensation value $c_i$ according to an equation as below:

$$c_i = c_{i-1} \qquad 4)$$

Considering the example as shown in FIGS. 4 and 5, the first transmitted six information bits are "1", "1", "1", "0", "1" and "0" and the information bit "1" will cause a transition in the first bit sequence. Accordingly, the phase compensation values are c0=0, c1=pi, c2=2*pi, c3=3*pi, c4=3*pi, c5=4*pi. These phase compensation values are applied into measured phases sequentially and then the phase deviation caused by bit flips or transition can be compensated.

Figure 6:
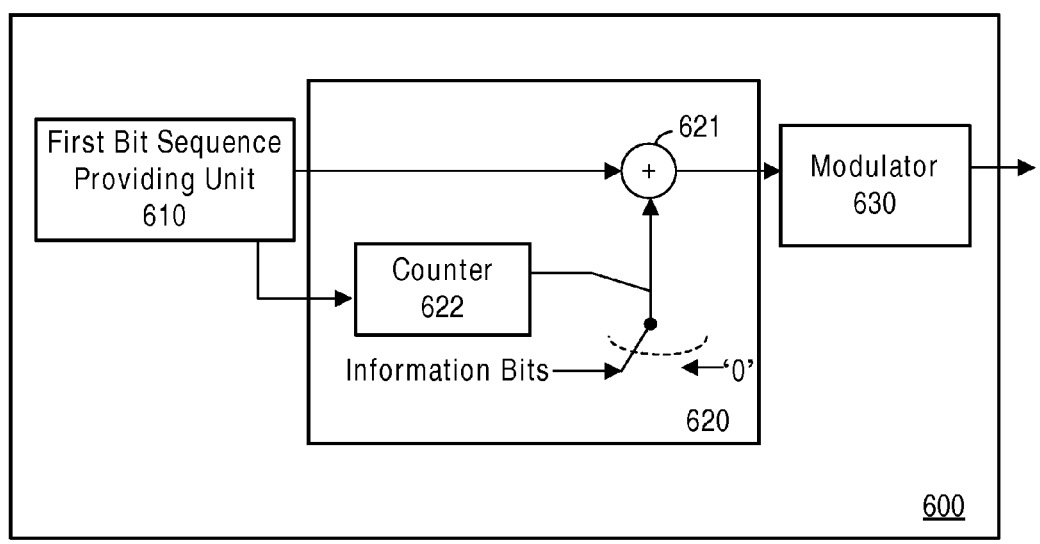
FIG. 6 schematically illustrates a block diagram of a transmitter according to one or more embodiments of the present invention.

FIG. 6 schematically illustrates a block diagram of a transmitter according to one or more embodiments of the present invention.

As shown in FIG. 6, the transmitter 600 such as a tag comprises a first bit sequence providing unit 610, a second bit sequence generating unit 620 and a modulator 630.

The first bit sequence providing unit 610 is configured to provide a first bit sequence of continuous bits to the second bit sequence generating unit 620. The continuous bits may be continuous "1" or continuous bits "0".

The second bit sequence generating unit 620 is configured to generate a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence.

According to one or more embodiments of the present invention, the second bit sequence generating unit 620 may be further configured to flipping the at least one bit in a modulation interval depending upon the value of a respective information bit.

In an implementation of the present invention, the second bit sequence generating unit 620 may comprise an adder 621 and a counter 622. The adder 621 such as a modular two adder has two inputting terminals, one for receiving the first bit sequence from the first bit sequence providing unit 610 and the other for receiving bits of the information bit sequence. The counter 622 is configured to keep counts of a number of bits outputted from the first bit sequence providing unit 610 and trigger to switch to the information bit sequence at least one respective fixed bit position of each modulation interval.

According to one or more embodiments of the present invention, the predetermined bit number $N_{modulation\_interval}$ satisfies:

$$N_{modulation\_interval} = n * L_{cw} / N_{measurement\_points},$$

where $L_{cw}$ denotes the length of the first sequence of continuous bits; $N_{measurement\_points}$ denotes the number of measurement points, at each of which positioning measurement is performed at receiving side based on the received modulated continuous wave signal by measuring phase differences among the plurality of different antenna elements; n denotes a predefined positive integer.

The second bit sequence generating unit 620 may be configured to arrange the bit positions of the replaced information bits and the measurement points such that only bits which belong to the continuous bits but not the replaced information bits will be used at the respective measurement points to perform the positioning measurement at receiving side.

The modulator 630 is configured to modulate the second bit sequence generated by said second bit sequence generating unit so as to generate a positioning packet with a modulated continuous wave signal for transmission.

According to one or more embodiments of the present invention, the modulator 630 may be a GFSK modulator. In those embodiments, the second bit sequence generating unit 620 may be configured to arrange the bit position of a replaced information bit in a modulation interval and a respective measurement point such that the replaced information bit is separated, by at least one bit, from a bit that will be used at the respective measurement point to perform the positioning measurement at receiving side. In this regard, the positioning packet including the modulated continuous wave signal may be a BLE packet used in the BLE system.

According to one or more embodiments of the present invention, the modulator 630 may be a modulator selected from the group consisting a FSK modulator, a PSK modulator, a PAM modulator, a QAM modulator.

Here, the transmitter 600 as illustrated in FIG. 6 is described with the modules or components which are most relevant to the embodiments of the present invention. However, those skilled in the art can appreciate that the base station 600 may also comprise other modules and components for performing the functionality of communication, including antennas; transceiver (having a transmitter (TX) and a receiver (RX)); processors such as one or more of general purpose computers, special purpose computers, microprocessors, digital signal processors (DSPs) and processors based on multi-core processor architecture; memory module of any type suitable to the local technical environment and implemented using any suitable data storage technology; etc. Those modules or components are well known in the art and the description thereof is omitted for the purpose of conciseness.

Figure 7:
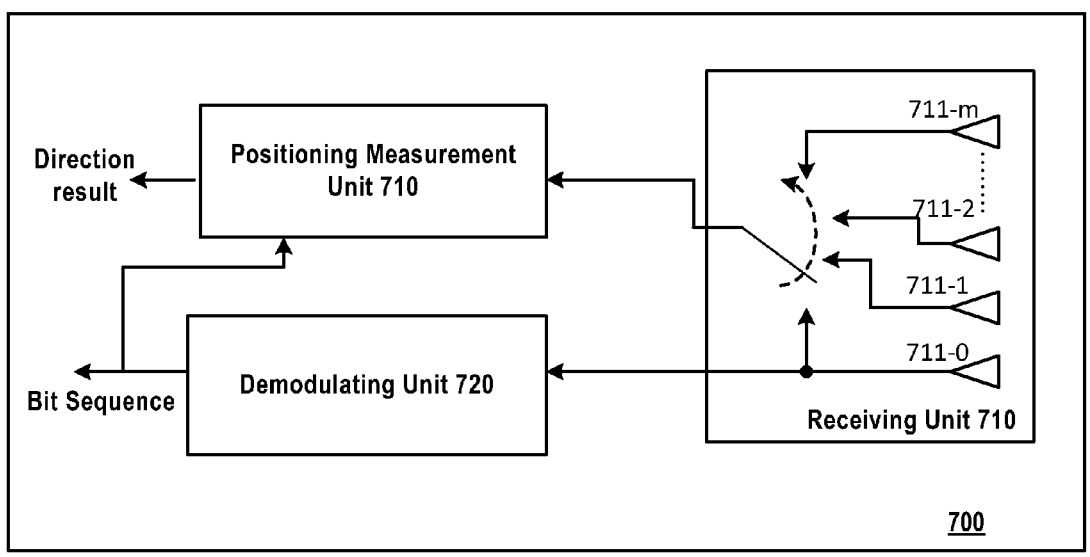
FIG. 7 schematically illustrates a block diagram of a receiver according to one or more embodiments of the present invention.

FIG. 7 schematically illustrates a block diagram of a receiver according to one or more embodiments of the present invention.

As shown in FIG. 7, the receiver 700 such as a beacon comprises a receiving unit 710, a demodulating unit 720 and a positioning measurement unit 730.

The receiving unit 710 comprises a plurality of different antenna elements 711-0, 711-1, ..., 711-m and is configured to receive a positioning packet with a modulated continuous wave signal via the antenna elements 711-0, 711-1, ..., 711-m. The receiving unit 710 is configured to switch between the different antenna elements 711-0, 711-1, ..., 711-m in a pre-defined order, so that the received signal can be provided to the positioning measurement unit 730 to perform positioning measurement. One the other hand, one of the antenna elements 711-0, 711-1, ..., 711-m (for example, the antenna element 771-0, as shown in FIG. 7) or a standalone antenna element (not shown in FIG. 7) may be coupled to the demodulating unit 720 so as to demodulate the received modulated continuous wave signal.

The demodulating unit 720 is configured to demodulate the modulated continuous wave signal to obtain a first bit sequence including a plurality of modulation intervals with a predetermined bit number $N_{modulation\_interval}$. In one modulation interval, at least one information bit occupies at least one fixed bit position and continuous bits "1" or continuous bits "0" occupy the other bit positions.

According to one or more embodiments, the demodulating unit 720 may comprise a GFSK demodulator according to the BLE specification. As alternative embodiments, the demodulating unit 720 may comprise a demodulator selected from the group consisting a FSK demodulator, a PSK demodulator, a PAM demodulator, a QAM demodulator. The demodulating unit 720 may also comprise components or module used for the functionality of signal processing, including for example a RF to IF/ZIF conversion module, protocol processing module and so on. Those modules or components are well known in the art and the description thereof is omitted for the purpose of conciseness.

In the meantime, the positioning measurement unit is configured to perform concurrently, based on the modulated continuous wave signal, positioning measurement by measuring phase differences among the different antenna elements 711-0, 711-1, . . . , 711-m at each of a number $N_{measurement\_points}$ of measurement points.

According to one or more embodiments of the present invention, the predetermined bit number $N_{modulation\_interval}$ satisfies:

$$N_{modulation\_interval}=n*L_{cw}/N_{measurement\_points},$$

where $L_{cw}$ denotes the length of the first sequence of continuous bits; n denotes a predefined positive integer.

According to one or more embodiments of the present invention, the measurement points and the bit positions of the information bits are arranged such that only bits which belong to the continuous bits but not the information bits will be used at the respective measurement points to perform the positioning measurement. In this regard, the requirement for measuring phase differences between antenna elements can be met, even though the continuous wave signal has been modulated to bear extra information bits.

In the embodiments where the modulated continuous wave signal is a GFSK modulated signal, the bit position of a information bit in a modulation interval and a respective measurement point should be arranged such that the replaced information bit is separated, by at least one bit, from a bit that will be used at the respective measurement point to perform the positioning measurement at receiving side.

In order to compensate the phase deviation caused by the bit transition, which may be introduced by extra information bit, the positioning measurement unit 730 may further comprise: a phase compensation unit 731 configured to apply phase compensation values $c_0, c_1, c_2, \ldots, c_i, \ldots, c_{Nmeasurement\_point-1}$ to the positioning measurement at the respective measurement points.

The phase compensation unit 731 may be further configured to compute, in response to determining that there are two sequential bit flips in the first bit sequence between the $(i-1)^{th}$ measurement point and the $i^{th}$ measurement point, the phase compensation value $c_i$ according to an equation as below:

$c_i=c_{i-1}+Pi$, when the first bit sequence is composed by the continuous bits "1" and the information bits, $c_i=c_{i-1}-Pi$, when first bit sequence is composed by the continuous bits "0" and the information bits.

The phase compensation unit 731 may be further configured to compute, in response to determining that there is not any bit flip in the first bit sequence between the $(i-1)^{th}$ measurement point and the $i^{th}$ measurement point, the phase compensation value $c_i$ according to an equation as below:

$c_i=c_{i-1}$.

Here, the receiver 700 as illustrated in FIG. 7 is described with the modules or components which are most relevant to the embodiments of the present invention. However, those skilled in the art can appreciate that the receiver 700 such as a beacon also comprises other modules and components for performing the functionality of communication and processing, including processors such as one or more of general purpose computers, special purpose computers, microprocessors, digital signal processors (DSPs) and processors based on multi-core processor architecture; memory module of any type suitable to the local technical environment and implemented using any suitable data storage technology; etc. Those modules or components are well known in the art and the description thereof is omitted for the purpose of conciseness.

According to one or more embodiments of the present invention, extra information bits can be transmitted over the modulated continuous wave signal without extra overhead. At meanwhile, the positioning measurement can be performed concurrently by using positioning algorithm maintaining unchanged. Therefore, transmission efficiency of user or controlling data is increased.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. An apparatus, comprising:
   at least one processor and at least one memory including computer program instructions, wherein the at least one memory and computer program instructions are configured to, with the at least one processor, cause the apparatus at least to:
   provide a first bit sequence of continuous bits "1" or continuous bits "0";

generate a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and modulate the second bit sequence so as to generate a positioning packet with a modulated continuous wave signal for transmission, wherein N is an integer.

2. The apparatus according to claim 1, wherein the predetermined bit number $N_{modulation\_interval}$ satisfies:

$$N_{modulation\_interval} = n * L_{cw} / N_{measurement\_points},$$

where $L_{cw}$ denotes the length of the first sequence of continuous bits; $N_{measurement\_points}$ denotes the number of measurement points, at each of which positioning measurement is performed at receiving side based on the received modulated continuous wave signal by measuring phase differences among a plurality of different antenna elements; n denotes a predefined positive integer.

3. The apparatus according to claim 1, wherein generate the second bit sequence comprises arrange bit positions of the replaced information bits and the measurement points such that only bits which belong to the continuous bits but not the replaced information bits will be used at the respective measurement points to perform the positioning measurement at receiving side.

4. The apparatus according to claim 1, wherein generate the second bit sequence comprises flip the at least one bit in a modulation interval depending upon the value of a respective information bit.

5. The apparatus according to claim 1, wherein modulate the second bit sequence comprises modulate the second bit sequence by a frequency-shift keying modulator, a phase-shift keying modulator, a pulse-amplitude modulation modulator or a quadrature amplitude modulation modulator.

6. An apparatus, comprising:
at least one processor and at least one memory including computer program instructions, wherein the at least one memory and computer program instructions are configured to, with the at least one processor, cause the apparatus at least to:
receive a positioning packet with a modulated continuous wave signal via a plurality of different antenna elements;
demodulate the modulated continuous wave signal to obtain a first bit sequence including a plurality of modulation intervals with a predetermined bit number $N_{modulation\_interval}$, wherein at least one information bit occupies at least one fixed position in each of said plurality of modulation intervals and continuous bits "1" or continuous bits "0" occupy the other positions in the respective modulation intervals; and
perform concurrently, based on the modulated continuous wave signal, positioning measurement by measuring phase differences among the plurality of different antenna elements at each of a number $N_{measurement\_points}$ of measurement points,
wherein N is an integer.

7. The apparatus according to claim 6, wherein the predetermined bit number $N_{modulation\_interval}$ satisfies:

$$N_{modulation\_interval} = n * L_{cw} / N_{measurement\_points},$$

where $L_{cw}$ denotes the length of the first bit sequence of continuous bits; n denotes a predefined positive integer.

8. The apparatus according to claim 6, wherein the measurement points and bit positions of the information bits are arranged such that only bits which belong to the continuous bits but not the information bits will be used at the respective measurement points to perform the positioning measurement.

9. The apparatus according to claim 6, wherein demodulate the modulated continuous wave signal comprises demodulate the modulated continuous wave signal by a Gaussian frequency-shift keying demodulator.

10. The apparatus according to claim 6, wherein the bit position of an information bit in a modulation interval and a respective measurement point are arranged such that the information bit is separated, by at least one bit, from a bit to be used at the respective measurement point to perform the positioning measurement, and further comprising at least one of:
apply phase compensation values $c_0, c_1, c_2, \ldots, c_i, \ldots, c_{Nmeasurement\_point-1}$ to the positioning measurement at the respective measurement points; and
compute, in response to determining that there are two sequential bit flips in the first bit sequence between an $(i-1)^{th}$ measurement point and an $i^{th}$ measurement point, a phase compensation value $c_i$ to be applied to the positioning measurement according to:
$c_i = c_{i-1} + Pi$, when the first bit sequence is composed of continuous bits "1" and the information bits,
$c_i = c_{i-1} - Pi$, when the first bit sequence is composed of continuous bits "0" and the information bits; and
compute, in response to determining that there is not any bit flip in the first bit sequence between an $(i-1)^{th}$ measurement point and an $i^{th}$ measurement point, a phase compensation value $c_i$ to be applied to the positioning measurement according to $c_i = c_{i-1}$.

11. A method comprising:
receiving a positioning packet with a modulated continuous wave signal via a plurality of different antenna elements;
demodulating the modulated continuous wave signal to obtain a first bit sequence including a plurality of modulation intervals with a predetermined bit number $N_{modulation\_interval}$, wherein at least one information bit occupies at least one fixed position in each of said plurality of modulation intervals and continuous bits "1" or continuous bits "0" occupy the other positions in the respective modulation intervals; and
performing concurrently, based on the modulated continuous wave signal, positioning measurement by measuring phase differences among the plurality of different antenna elements at each of a number $N_{measurement\_points}$ of measurement points,
wherein N is an integer.

12. The method according to claim 11, wherein the predetermined bit number $N_{modulation\_interval}$ satisfies:

$$N_{modulation\_interval} = n * L_{cw} / N_{measurement\_points},$$

where $L_{cw}$ denotes the length of the first bit sequence of continuous bits; n denotes a predefined positive integer.

13. The method according to claim 11, wherein the measurement points and bit positions of the information bits are arranged such that only bits which belong to the continuous bits but not the information bits will be used at the respective measurement points to perform the positioning measurement.

14. The method according to claim 11, wherein demodulating the modulated continuous wave signal comprises demodulating the modulated continuous wave signal by a Gaussian frequency-shift keying demodulator.

15. The method according to claim 11, wherein the bit position of an information bit in a modulation interval and a respective measurement point are arranged such that the information bit is separated, by at least one bit, from a bit to be used at the respective measurement point to perform the positioning measurement, and further comprising at least one of:
  applying phase compensation values $c_0, c_1, c_2, \ldots, c_i, \ldots, c_{Nmeasurement\_point-1}$ to the positioning measurement at the respective measurement points; and
  computing, in response to determining that there are two sequential bit flips in the first bit sequence between an $(i-1)^{th}$ measurement point and an $i^{th}$ measurement point, a phase compensation value $c_i$ to be applied to the positioning measurement according to:
  $c_i = c_{i-1} + Pi$, when the first bit sequence is composed of continuous bits "1" and the information bits,
  $c_i = c_{i-1} - Pi$, when the first bit sequence is composed of continuous bits "0" and the information bits; and
  computing, in response to determining that there is not any bit flip in the first bit sequence between an $(i-1)^{th}$ measurement point and an $i^{th}$ measurement point, a phase compensation value $c_i$ to be applied to the positioning measurement according to $c_i = c_{i-1}$.

16. A method, comprising:
  providing a first bit sequence of continuous bits "1" or continuous bits "0";
  generating a second bit sequence by replacing, in each of a plurality of modulation intervals with a predetermined bit number $N_{modulation\_interval}$, at least one bit of the first bit sequence at least one fixed position of the respective modulation interval with one information bit from an information bit sequence; and
  modulating the second bit sequence so as to generate a positioning packet with a modulated continuous wave signal for transmission,
  wherein N is an integer.

17. The method according to claim 16, wherein the predetermined bit number $N_{modulation\_interval}$ satisfies:

$$N_{modulation\_interval} = n * L_{cw} / N_{measurement\_points},$$

where $L_{cw}$ denotes the length of the first sequence of continuous bits; $N_{measurement\_points}$ denotes the number of measurement points, at each of which positioning measurement is performed at receiving side based on the received modulated continuous wave signal by measuring phase differences among a plurality of different antenna elements; n denotes a predefined positive integer.

18. The method according to claim 16, wherein generating the second bit sequence comprises arranging bit positions of the replaced information bits and the measurement points such that only bits which belong to the continuous bits but not the replaced information bits will be used at the respective measurement points to perform the positioning measurement at receiving side.

19. The method according to claim 16, wherein generating the second bit sequence comprises flipping the at least one bit in a modulation interval depending upon the value of a respective information bit.

20. The method according to claim 16, wherein modulating the second bit sequence comprises modulating the second bit sequence by a frequency-shift keying modulator, a phase-shift keying modulator, a pulse-amplitude modulation modulator or a quadrature amplitude modulation modulator.

21. A computer program product, comprising at least one non-transitory computer readable storage medium having a computer readable program code portion stored thereon, the computer readable program code portion comprising:
  program code instructions for providing a first bit sequence of continuous bits "1" or continuous bits "0";
  program code instructions for generating a second bit sequence by replacing, in each of a plurality of modulation intervals with a predetermined bit number $N_{modulation\_interval}$, wherein N is an integer, at least one bit of the first bit sequence at least one fixed position of the respective modulation interval with one information bit from an information bit sequence; and
  program code instructions for modulating the second bit sequence so as to generate a positioning packet with a modulated continuous wave signal for transmission.

22. A computer program product, comprising at least one non-transitory computer readable storage medium having a computer readable program code portion stored thereon, the computer readable program code portion comprising:
  program code instructions for receiving a positioning packet with a modulated continuous wave signal via a plurality of different antenna elements;
  program code instructions for demodulating the modulated continuous wave signal to obtain a first bit sequence including a plurality of modulation intervals with a predetermined bit number $N_{modulation\_interval}$, wherein at least one information bit occupies at least one fixed position in each of said plurality of modulation intervals and continuous bits "1" or continuous bits "0" occupy the other positions in the respective modulation intervals; and
  program code instructions for performing concurrently, based on the modulated continuous wave signal, positioning measurement by measuring phase differences among the plurality of different antenna elements at each of a number $N_{measurement\_points}$ of measurement points,
  wherein N is an integer.

* * * * *